(12) United States Patent
Niessen et al.

(10) Patent No.: US 6,680,884 B1
(45) Date of Patent: Jan. 20, 2004

(54) APPARATUS AND METHOD FOR SCANNING A ROTATING INFORMATION CARRIER

(75) Inventors: Arnoldus J. Niessen, Eindhoven (NL); Joris J. Vrehen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/553,606

(22) Filed: Apr. 20, 2000

(30) Foreign Application Priority Data

Apr. 23, 1999 (EP) ............................................. 99201284

(51) Int. Cl.[7] ................................................. G11B 7/00
(52) U.S. Cl. ...................... 369/44.28; 369/43; 369/30.1
(58) Field of Search ............................. 369/30.1, 44.28, 369/30.15, 30.37, 53.22, 30.23, 53.29, 47.36, 43; 360/78.06, 78.04; 386/121, 125, 131, 69, 111; 711/4, 154

(56) References Cited

U.S. PATENT DOCUMENTS

| | | | | |
|---|---|---|---|---|
| 4,577,300 A | * | 3/1986 | Katsuyama et al. | 369/43 |
| 4,677,500 A | * | 6/1987 | van Lier | 386/121 |
| 4,706,133 A | * | 11/1987 | Giddings | 386/125 |
| 5,283,875 A | | 2/1994 | Gibson et al. | 711/4 |
| 5,321,676 A | | 6/1994 | van Velthoven et al. | 369/30.1 |
| 5,570,332 A | | 10/1996 | Heath et al. | 369/30.1 |
| 5,809,201 A | * | 9/1998 | Nagasawa | 386/11 |
| 5,864,521 A | | 1/1999 | Tamegai | 369/30.23 |
| 5,953,292 A | * | 9/1999 | Araki et al. | 369/30.15 |
| 5,995,458 A | * | 11/1999 | Itoi | 369/30.37 |

\* cited by examiner

*Primary Examiner*—William Korzuch
*Assistant Examiner*—Kim-Kwok Chu
(74) *Attorney, Agent, or Firm*—Michael E. Belk

(57) ABSTRACT

Apparatus for scanning a rotating information carrier having mutually substantially parallel tracks for the recording of information. The apparatus includes a transducer for scanning the information carrier and for generating a position signal which indicates a position of a scanning point scanned by the transducer. The apparatus further includes means for rotating the information carrier about an axis and means for moving the scanning point in a radial direction with respect to the axis. The apparatus has a scanning mode in which the scanning point jumps both from one track to another in a first radial direction and from one track to another in an opposite second direction during reading or writing of a file.

11 Claims, 6 Drawing Sheets

APPARATUS AND METHOD FOR SCANNING A ROTATING INFORMATION CARRIER

BACKGROUND OF THE INVENTION

1. Technical Field

The invention relates to an apparatus for scanning a rotating information carrier, which information carrier has mutually substantially parallel tracks for the recording of information, which apparatus includes a transducer for scanning the information carrier and generating a position signal which is indicative of the position of a scanning point of the information carrier, which point is scanned by the transducer, means for rotating the information carrier about an axis, and means for moving the scanning point radially with respect to the axis.

The invention further relates to a method for scanning a rotating information carrier.

2. Related Art

Such an apparatus is known from U.S. Pat. No. 5,321,676. The known apparatus has coarse positioning means in the form of a slide carrying the transducer and a motor for driving the slide and has fine positioning means for positioning the scanning point with respect to the transducer. The apparatus is suitable for reading information carriers having tracks which together form a spiral. In the known apparatus the scanning means cause the scanning point to follow the track. For this purpose, the position of the fine positioning means is corrected continually. As soon as a signal indicative of the position of the fine positioning means exceeds a threshold value the transducer is moved stepwise. When a command is given to read and/or write a file the starting point of the file generally does not have the same tangential position as the scanning spot. It takes some time, hereinafter referred to as rotational latency time, until the rotational position of the starting point and that of the scanning point coincide. However, during reading and/or writing it is desired to have a minimal rotational latency time.

SUMMARY OF THE INVENTION

It is an object of the invention to provide an apparatus and a method which enable the rotational latency time to be reduced.

To this end, the apparatus in accordance with the invention is characterized in that the apparatus has a scanning mode in which during reading and/or writing of a continuous file the scanning point is moved both from one track to another track in a first radial direction and from one track to another track in a second radial direction opposite thereto.

In the method in accordance with the invention, for scanning a rotating information carrier, which information carrier has mutually substantially parallel tracks for the recording of information, a signal is generated which is indicative of the position of a scanning point of the information carrier, the information carrier being rotated about an axis and the scanning point being moved in a direction transverse to the axis, which method comprises a scanning mode in which during reading and/or writing of a continuous file the scanning point is moved both from one track to another track in a first radial direction and from one track to another track in a second radial direction opposite thereto.

In the apparatus and the method in accordance with the invention reading and/or writing of file information is started at the tangential position of the information carrier which instantaneously coincides with the tangential position of the scanning point immediately upon reception of the command in said scanning mode. Consequently, there is no rotational latency time. However, there may be a latency time during reading and/or writing of the file. As a rule, it is favorable to effect reading in accordance with said scanning mode if the information carrier should traverse a comparatively large angle before the tangential position of the starting point of the file has come within the range of the scanning point.

It is to be noted that from U.S. Pat. No. 5,570, a method is known for reducing the average rotational latency time. In this method the access time is calculated for different files. The information carrier is then divided into tangential zones. Within each of said zones an area is determined that can be reached within the time interval required for the rotation of the relevant tangential zone to the transducer. Subsequently, the command having the smallest rotational latency time is selected from queue of commands. This latency time is the sum of the times required for a radial and a tangential excursion. The known method is only suitable for the situation that there are different search commands. However, it is also desirable to minimize the time required for reading in the case that there is only one search command.

Moreover, it is to be noted that from U.S. Pat. No. 5,283,875 a method is know in which blocks of information are recorded in reverse order on the information carrier. Thus, it achieved that the operating system already reads in blocks having a higher block number during the rotational latency time. However, this method does not provide a solution in the case that a track has been inscribed only partly. Said method does not lead to a reduction of the rotational latency time when applied to information carriers written in a customary manner.

A variant of the method in accordance with the invention is characterized in that in said scanning mode the scanning point moves one time in the first radial direction and subsequently moves more gradually in the second radial direction. This variant has the advantage that not many abrupt movements of the scanning point are required, which contributes to a low power consumption.

Another variant of the method in accordance with the invention is characterized in that during every revolution the scanning point jumps from one track to another track in the first radial direction and jumps from one track to another track in the second radial direction. This variant enables information streams such as video/audio streams to be made available rapidly.

An apparatus in accordance with the invention can choose from the various methods in accordance with the invention to scan the information carrier or can scan the information carrier in a conventional manner, i.e. sequentially. The choice from the different variants of the method in accordance with the invention and the conventional method may depend, for example, on the type of file, the type of information carrier (spiral/circular tracks), the instantaneous position of the information carrier relative to the transducer, and the permissible power consumption during the displacement of the transducer. The information carrier may be scanned for example in a conventional manner if the starting position of the file nearly coincides with the range of the transducer. In this situation there is no rotational latency time when the conventional method is used.

There are several possibilities of storing information on an information carrier. The information may be stored, for example, as a magnetically or an optically detectable pattern. The tracks may be separate and concentric with respect to one another but alternatively they may together form a spiral. The method is particularly suitable for an information carrier as proposed in the format-C DVD-RAM, in which the tracks are divided into sectors having a header, sectors of mutually adjacent tracks having mutually the same tangential boundaries. Since mutually adjacent sectors have the same tangential boundaries the transducer can directly read a following sector upon a radial displacement at the end of a sector.

The file to be read or written is for example a data file, an audio file or a video file or it includes information referring to other files.

In an attractive embodiment the apparatus has a buffer coupled to the transducer. This allows information of a file read from the information carrier in said scanning mode to be made available in a sequential order and/or information which is available in a sequential order to be arranged in the order in which it is written onto the information carrier. A favorable embodiment of the apparatus in accordance with the invention is characterized in that the means for moving the scanning point radially with respect to the axis include coarse positioning means and fine positioning means, jumping to an adjacent track being effected by the fine positioning means. This allows jumps to be made rapidly using little power.

BRIEF DESCRIPTION OF THE DRAWINGS

These as well as other aspects of the invention will be described in more detail with reference to the drawings. In the drawings.

DETAILED DESCRIPTION OF THE INVENTION

Figure 1:
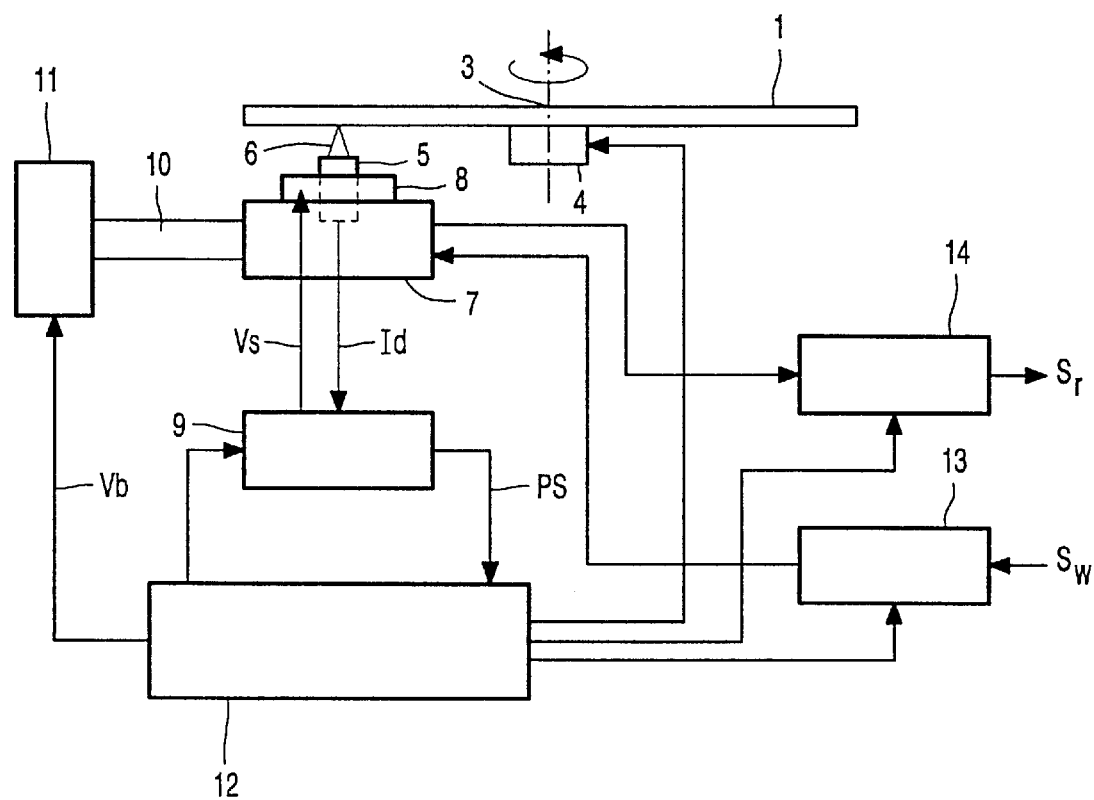
FIG. 1 shows an embodiment of an apparatus in accordance with the invention.

FIG. 1 shows diagrammatically an apparatus for reading and/or writing information from/onto a rotating information carrier 1. The apparatus has a transducer 5 for the generation of a position signal Id. This signal provides an indication of a position of a scanning point 6 scanned by the transducer 5. In one example the information carrier is a magnetic information carrier. In that case the transducer is, for example, a magnetic head which generates an electric signal in response to a magnetic pattern recorded on the information carrier. In the present example the information carrier 1 is an optical information carrier. The transducer 5 has, for example, means for imaging a radiation beam onto the information carrier 1 and means for detecting radiation reflected from the information carrier. The apparatus 1 includes a motor 4 which forms means for rotating the information carrier 1 about an axis 3. The transducer 5 is carried by a slide 7, which is driven by a slide motor 11 via shaft 10. The slide 7, the shaft 10 and the slide motor 11 form coarse positioning means. The apparatus further has fine positioning means 8, which enable small excursions of the scanning point 6 to be made rapidly. The slide motor 11 and the motor for rotating the information carrier 1 are controlled by a control unit 12. The fine positioning means 8 are controlled by a servo control 9 and the control unit 12. With the aid of the fine positioning means 8 and the coarse positioning means 7, 10, 11 the scanning point 6 can be moved radially with respect to the axis 3.

The apparatus shown in FIG. 1 has a buffer 13 for receiving a write signal Sw and for applying the information provided by the write signal to the transducer in an order which corresponds to the order in which it is written onto the information carrier. The apparatus further has a buffer 14 for receiving a signal read by the transducer and for arranging the information furnished by this signal in a sequential order. Both buffers are controlled by the control unit 12.

The invention relates to a method of scanning the information carrier when information is read and/or written. This can be realized by basically conventional means as shown in FIG. 1. Therefore, the means shown do not require any further information.

Figure 2:
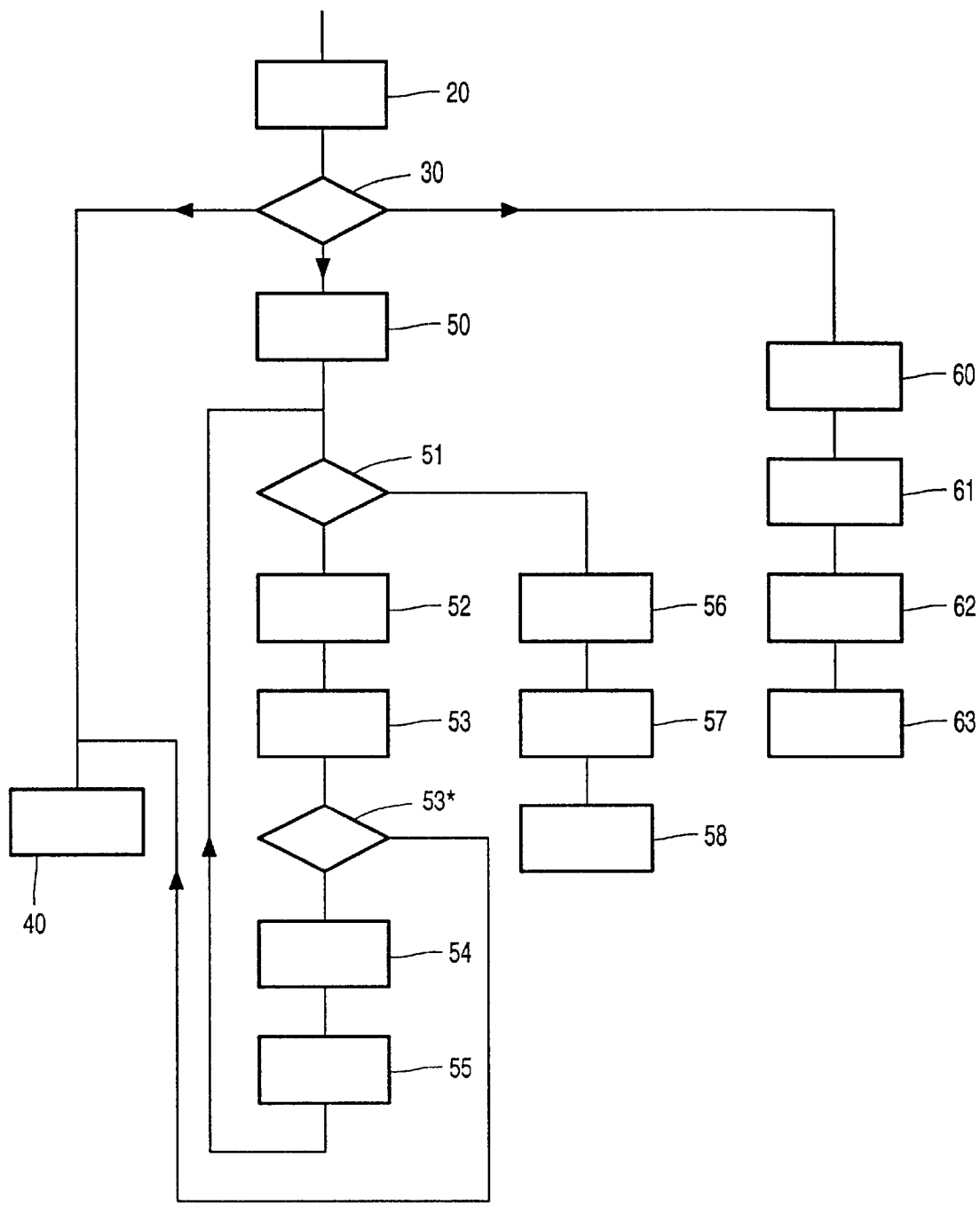
FIG. 2 shows a variant of a method in accordance with the invention.

The manner in which information is read or written in the apparatus in accordance with the invention is described in more detail with reference to FIG. 2.

After the apparatus has received a command for reading or writing a file a first program section 20 is carried out to determine the coordinates of the starting position ($R_B$, $\alpha_B$) of the file and the coordinates of the end position of the file ($R_E$, $\alpha_E$). $R_E$, $\alpha_E$ are the radial components of the relevant positions, i.e. the distance of the position to the axis 3. The tangential components ($\alpha_B$, $\alpha_E$) of a position are defined as the angle to be traversed in the direction of rotation of the information carrier 1 until the relevant position lies within range of the scanning point. In a subsequent second program section 30 the scanning mode in accordance with which the file is to be read or written is chosen. The choice may depend, for example, on the type of file, the type of information carrier (spiral/circular tracks), the instantaneous position of the information carrier with respect to the transducer, and the permissible power consumption during the displacement of the transducer. If only a small rotational latency time is required before the starting position ($R_B$, $\alpha_B$) of the file has come within the range of the scanning point 6, the program proceeds to a third program section 40. This program section 40 causes the file to be read or written sequentially in accordance with a first scanning mode. This scanning mode will not be described in further detail because it is a customary method of scanning. If a longer rotational latency time is needed before the starting position $(R_B, \alpha_B)$ of the file is within the range of the scanning point 6, either a second scanning mode in accordance with a fourth program section having program steps 50–58 or a third scanning mode in accordance with a fifth program section having program steps 60–63 can be carried out. The scanning point jumps from one track to another track in the first radial direction and from one track to another track in the second radial direction, which is opposite thereto, during every revolution in the second scanning mode. In the present case the scanning point jumps inward at an angle $\alpha_-$ and outward at an angle $\alpha_+$. The second scanning mode is particularly suitable if an information stream, such as an audio stream or a video stream, is to be read rapidly. The scanning point moves once in the first radial direction and subsequently moves more gradually in the second radial direction during reading/writing in the third scanning mode. The third scanning mode has the advantage that the number of jumps of the scanning point and, consequently, the required power consumption is limited. The fourth program section 50–58 has a first program step 50, in which the scanning point 6 is positioned on a track which carries files information or is to be inscribed with file information at the instantaneous angle of the information carrier 1. In a second program step 51 of the fourth program section it is determined whether the current track is the last track which forms part of the file to be read or written. If this is not the case a first series of program steps 52–55 is carried out. In the program step 52 the scanning point 6 follows the current track to an angle $\alpha = \alpha_-$. In the program step 53 the scanning point jumps to an adjacent track situated nearer the axis 3. Subsequently, it is checked in a program step 53* whether the difference $\alpha_{B-} - \alpha_{B+} - 2^*D$ is greater than a threshold value. If this is not the case, it is no longer advantageous to read or write the file in accordance with the second scanning mode and the program proceeds with the first scanning mode in the third program section 40. If the difference is greater than the threshold value the track is followed to an angle $\alpha = \alpha_+$. In program step 55 the scanning point 6 jumps to an adjacent track which is remoter from the axis 3. As long as the last track has not been reached the first series of program steps 52–55 is repeated. The angles $\alpha_-$ and $\alpha_-$ may be adapted each time after the series has been carried out. This is explained with reference to FIG. 3D. If the last track has been reached a second series of program steps 56–58 is carried out. In the first program step 56 of this series the scanning point 6 follows the current track until the angle $\alpha = \alpha_E$ is reached. Subsequently, the scanning point 6 jumps to an adjacent track situated nearer the axis 3 in the program step 57. Subsequently, this track is read or recorded over angle from $\alpha = \alpha_B$ to $\alpha = 0$ in the program step 58.

The fifth program section 60–63, which describes the third scanning mode, has a first program step 60 in which the scanning point is first moved to the outermost track assigned to the file. Subsequently, this track is followed in program step 61 until the starting position $(R_B, \alpha_B)$ is within the range of the scanning point 6. In the program step 62 the scanning point is made to move in the first radial direction, in this case in the inward direction. In the program step 63 the remainder of the file is read sequentially, the scanning point being moved more gradually in the opposite radial direction.

Figure 3A:
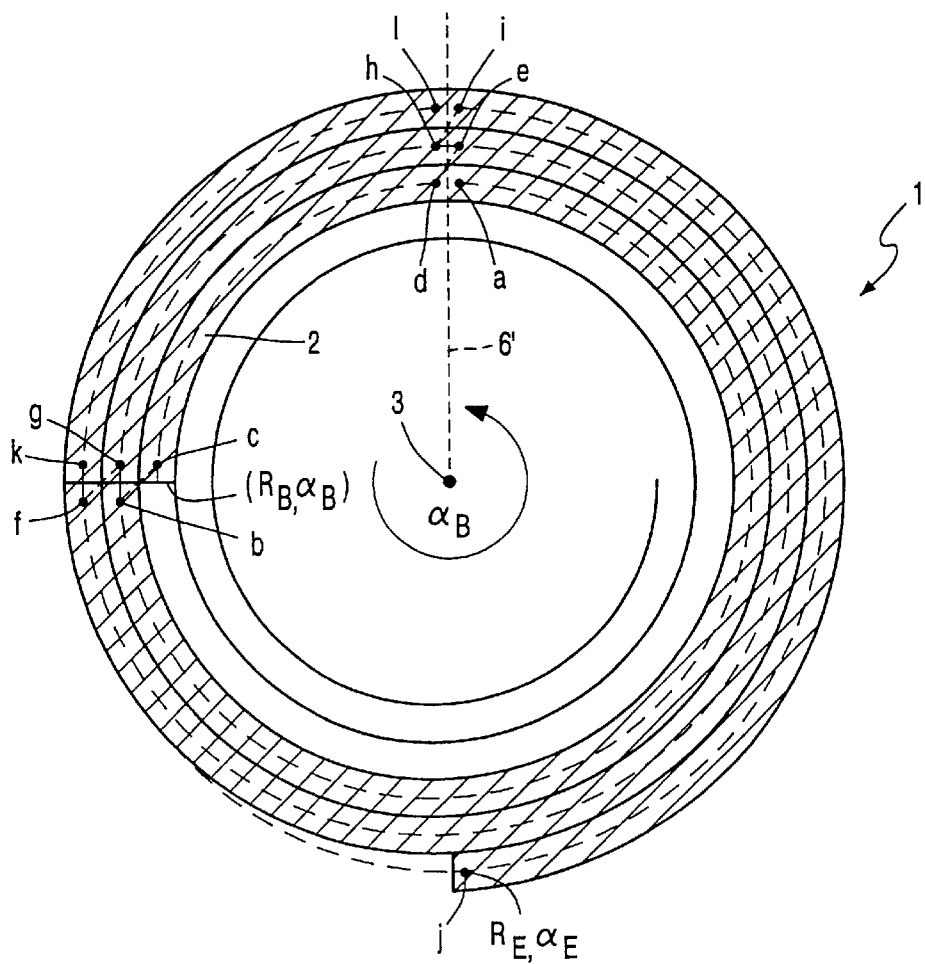
FIG. 3A shows a first information carrier, for which a path followed by the scanning point in the case of a method in accordance with the invention is indicated, FIG. 3B graphically represents the relationship between the radial coordinate (R) of the scanning point and the angle ($\alpha$) traversed by the first information carrier for the path shown in FIG. 3A, FIG. 3C graphically represents the relationship between the radial coordinate (R) of the scanning point and the angle ($\alpha$) traversed by the first information carrier shown in FIG. 3A in the case of a conventional method.

FIG. 3A shows diagrammatically an information carrier 1 having tracks 2 which together form a spiral. The information carrier 1 carries an information file, which is represented as a hatched area. In the Figure $(R_B, \alpha_B)$ and $(R_E, \alpha_E)$ are, respectively, the starting position and the end position of the file. The dashed line 6' indicates the range over which the scanning point 6 can be moved. In the present example the information carrier should perform 0.75 revolution before the starting position $(R_B, \alpha_B)$ of the file to be read or written reaches the range 6'. in the case of a speed of 23 revolutions/ second this corresponds to a rotational latency time of 32 ms. The apparatus in accordance with the invention now provides a reduction of the rotational latency time in that during reading and/or writing of a continuous file the information carrier 1 is scanned in accordance with a scanning mode in which the scanning point is moved both from one track to another track in a first radial direction and from one track to another track in an opposite second radial direction. In this case the scanning point 6 jumps from a track to a more inward track and from a track to a more outward track for every revolution during reading and/or writing. The scanning point 6 the follows the path a-1 with respect to the information carrier 1.

Figure 3B:
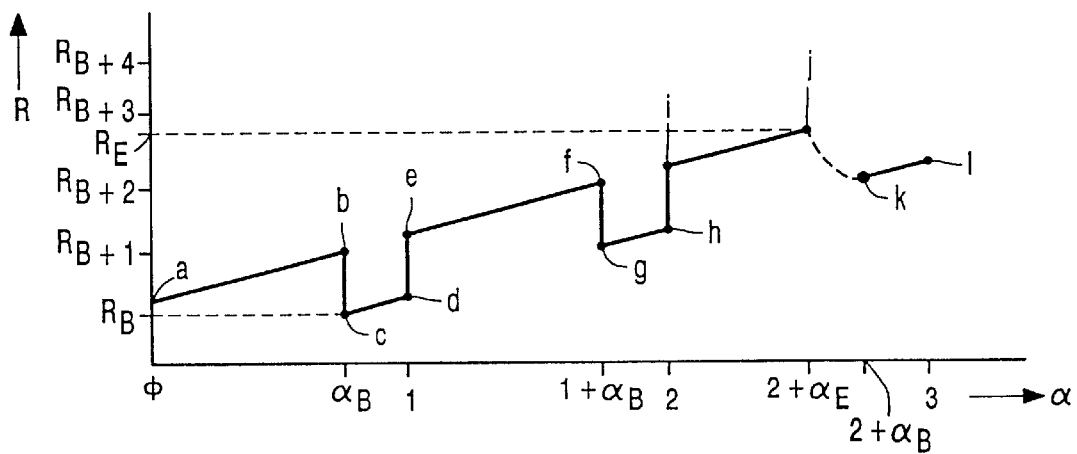
FIG. 3D shows a first information carrier, for which a path followed by the scanning point in the case of a method in accordance with the invention is indicated.

FIG. 3B shows the relationship between the radial coordinate (R) of the scanning point 6 and the angle ($\alpha$) traversed by the information carrier 1 in the case of the method in accordance with the invention. The vertical axis represents the radial position R of the scanning point 6 with respect to the axis 3, the unit of the radial coordinate being the track pitch. The horizontal axis represents the angle $\alpha$ traversed by the information carrier from the beginning of the path. The unit of the angle $\alpha$ is one revolution of the information carrier 1. In the present case the path begins at a radial coordinate $R_B + 0.25$. The scanning point 6 now has a radial position a which coincides with a track 2 containing information of the file to be read. Subsequently, the scanning point 6 is moved in a radial direction R at a speed proportional to the angular velocity with which the information carrier 1 is rotated so that the scanning point 6 follows the track 2. After the information carrier 1 has traversed an angle $\alpha_B$ the scanning point 6 jumps from a position b having a radial coordinate $R_{B+1}$ to a position c having a radial coordinate $R_B$. The scanning point 6 now follows the track 2 from the starting position for 0.25 revolutions of the information carrier 1, the value of the radial position R increasing proportionally to the angle $\alpha$ until the angle has become equal to 0 and then jumps from a position d having a radial coordinate $R_B + 0.25$ to a position e having a radial coordinate $R_B + 1.25$. During the next revolution of the information carrier 1 the scanning point 6 moves along the path e-f-g-h-i in the same was as along the path a-b-c-d-e during the first revolution. After two revolutions of the information carrier ($\alpha = 2$) the scanning point 6 has reached a position i having a radial coordinate $R_B + 2.25$. The scanning point 6 now follows the track 2 again until the angle traversed by the information carrier 1 is $2 + \alpha_E$ (position j). Then, the end of the file to be read is reached. What now remains is a track which extends from a position k ($R_B + 2$, $2 + \alpha_B$ (mod 1)) to position ($R_B + 2.25$, 3 (mod 1)). During the rotation from a position $j(\alpha = 2 + \alpha_E)$ to a position k ($\alpha = 2 + \alpha_B$) it is not possible to read any file information which has not been read previously. In the time interval in which said rotation takes place the scanning point 6 is moved to a radial position $R_B + 2$. This may be effected stepwise but also more gradually. During the rotation from $\alpha = 2 + \alpha_B$ to $\alpha 3$ the scanning point is moved from $R_B + 2$ to $R_B + 2.25$ and the remainder (from position k to position 1) of the file is read or written. In this case the inward jump is effected if the information carrier 1 takes up an angle $\alpha = \alpha_B$ and an outward jump is effected if the information carrier takes up an angle $\alpha_{+=}0$ while the program steps 52–55 are carried out.

Figure 3C:
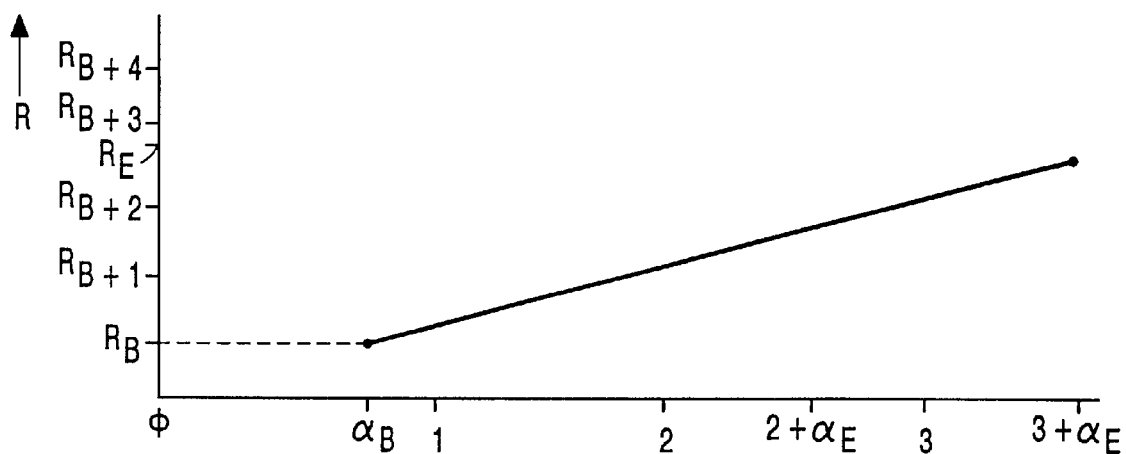

FIG. 3C illustrates the customary method by which the file could be read or written. In that case reading or writing is deferred until the information carrier 1 has rotated through an angle $\alpha_B$, after which the scanning point 6 follows the continuous spiral tracks 2 from the starting position ($R_B$, $\alpha_B$) to the end position ($R_E$, $\alpha_E$). With the customary method the latency time corresponds to the duration of 0.75 revolution. With the method in accordance with the invention the latency time in this case corresponds to the duration of 0.25 revolution.

Figure 3D:
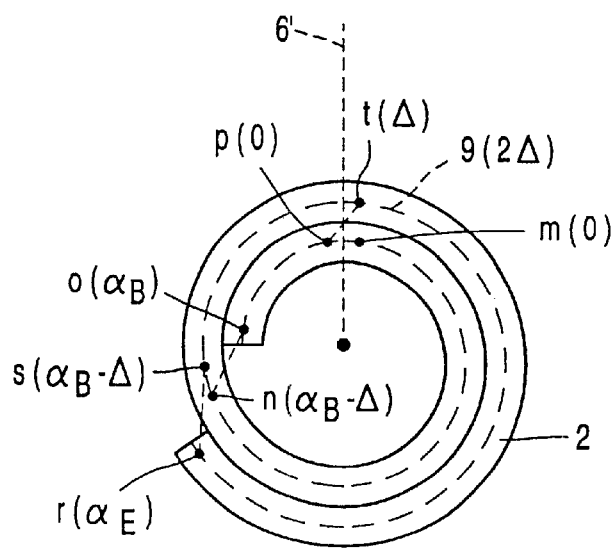

For the sake of clarity it has been assumed hereinbefore that the jump to an adjacent track is effected instantaneously and the information carrier 1 can be inscribed or read immediately after the jump. In practice, the information carrier 1 also rotates during the jump to another track and initialization of means for processing a signal to be read or for generating a signal to be written may take time. This is illustrated in FIG. 3D. FIG. 3D represents the orientation of the information carrier 1 with respect to the transducer 5 at the instant that the read or write command is given. The path m-t followed by the scanning point 6 on the information carrier 1 is shown as a broken line. The angles corresponding to the points of the path m-t are given in parentheses. It is assumed that during each jump and the subsequent initialization the information carrier 1 traverses an angle $\Delta$. The path begins at the innermost track allocated to the file to be read or written and situated in the range 6' of the scanning point. The scanning point 6 now follows this track from the point m to the point n. The information carrier 1 has then traversed an angle $\alpha = \alpha_B - \Delta$ and then jumps one track inward. After the jump and after initialization reading or writing of the file can proceed when the information carrier has traversed an angle $\alpha_B$. The scanning point has now reached the beginning (point o) of the area of portion of the information carrier 1 assigned to the file. From this point the track 2 is followed until the information carrier 1 has made one revolution and thus takes up an angle $\alpha_+ = 0$. The scanning point then coincides with a point p. Subsequently, the scanning point 6 jumps one track outward to a point q. Reading or writing of the file from/to this track 2 proceeds after $1+\Delta$ revolutions. This track is followed until the end (point r) of the portion assigned to the file is reached. The scanning point 6 then again jumps one track 2 inward. This track is read or inscribed during the rotation of the information carrier from $1+\Delta_B-\Delta$ revolutions (point s) to $2+\Delta$ revolutions (point t). In this case the values of $\alpha_-$ and $\alpha_+$ are adapted each time that the program steps 52–55 are performed again, in order to allow for the rotation of the information carrier 1 during the jump and the time needed for initialization. The successive values of $\alpha$ are then $\alpha_B-\Delta$, $\alpha_B-2\Delta$, $\alpha_B-3\Delta$ etc. and th successive values of $\alpha_+$ are then 0, $\Delta$, $2\Delta$ etc.

Figure 4A:
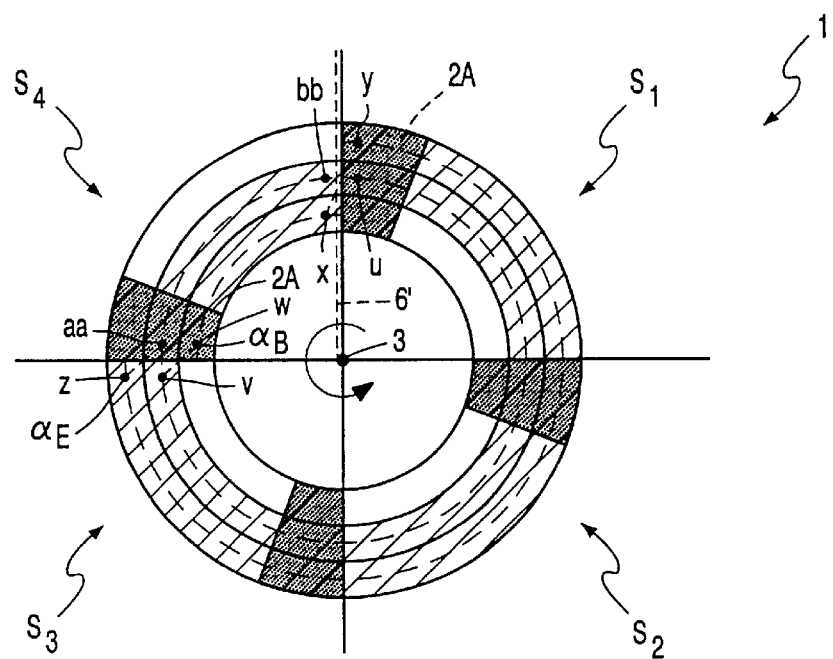
FIG. 4A shows a second information carrier, for which a path followed by the scanning point in the case of a method in accordance with the invention is indicated, FIG. 4B graphically represents the relationship between the radial coordinate (R) of the scanning point and the angle ($\alpha$) traversed by the first information carrier for the path shown in FIG. 4A, FIG. 5 graphically represents the relationship between the radial coordinate (R) of the scanning point and the angle ($\alpha$) traversed by the first information carrier shown in FIG. 3A in the case of another method in accordance with the invention.
Figure 4B:
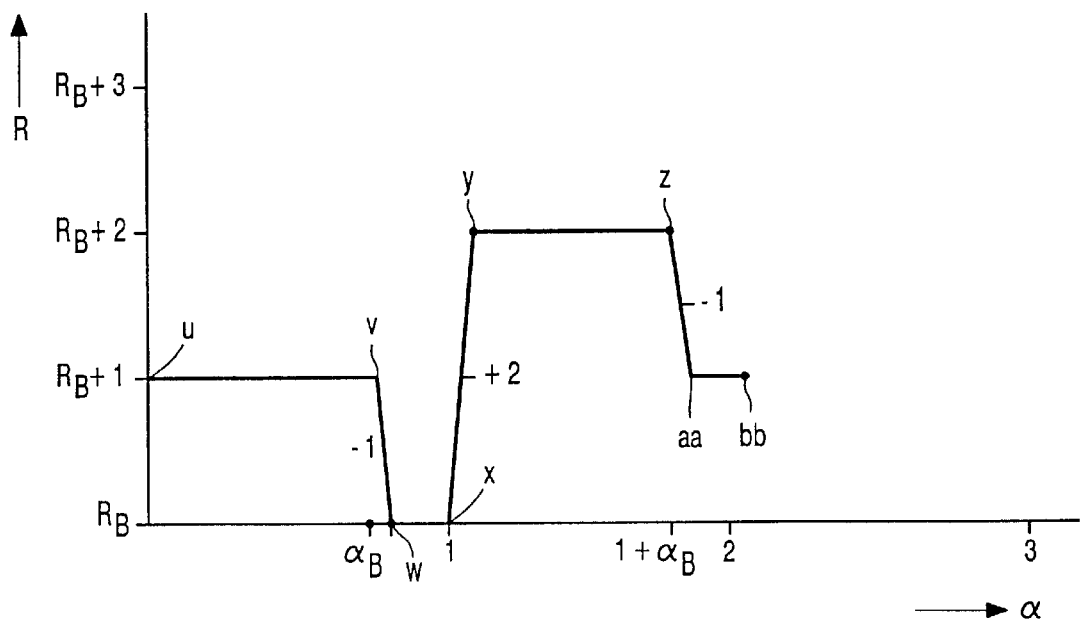

FIG. 4A shows an information carrier 1 whose tracks 2 have been divided into four sectors S1–S4 each having a header 2A. The part of the information carrier 1 occupied by the file is shown as a hatched area. The sectors of mutually adjacent tracks have mutually the same tangential boundaries. FIG. 4B illustrates the path followed by the scanning point. This path begins at a point u at the first track from the axis 3 of the information carrier portion assigned to the file and situated within the range 6' of the scanning point 6 at the instant at which the read or write command is received. The scanning point follows this track to the point u. The information carrier 1 has then made $\alpha_B$ revolution and thus takes up an angle $\alpha_- = \alpha_B$. Subsequently, the scanning point 6 jumps to a point w of the innermost track assigned to the file. This track contains the beginning of the file information. As the scanning point jumps to the header 2A of the track the file information can be read or written without being hindered by the fact that the information carrier 1 rotates during the jump. The scanning point follows this track to a point x. The information carrier 1 has then performed 1 revolution and thus occupies an angle $\alpha_+ = 0$. The scanning point subsequently jumps two tracks in an outward direction (from the point x a point y) and follows this track until $1+\alpha_B$ revolutions have been made. The scanning point 6 then jumps one track inward from a point z to a point aa and follows this to a point bb. Then, 2 revolutions have been made.

Figure 5:
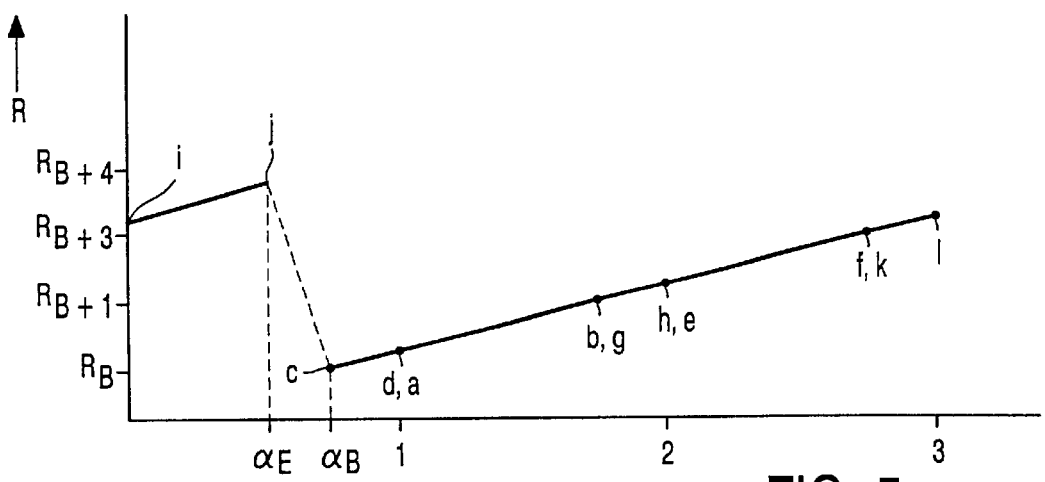

FIG. 5 graphically shows the relationship between the radial coordinate (R) of the scanning point and the angle ($\alpha$) traversed by the information carrier shown in FIG. 3A for another method in accordance with the invention. In this method the program steps 60–63 of the program shown in FIG. 2 are carried out. This results in a scanning mode in which the scanning point moves one time in the first radial direction and subsequently moves more gradually in the second radial direction. During reading/writing the scanning point is positioned at a point i of the outermost track 2 of the information carrier in FIG. 3A which has been assigned to the file (program step 60). After this, the scanning point 6 follows the path i-j along the track 2, a point j being the end position ($R_E$, $\alpha_E$) of the file (program step 61). Subsequently, the scanning point moves from the point j on the track 2 followed so far to a point c on a more inward track (program step 62). The point c is also the starting position ($R_B$, $\alpha_B$) of the file. After the scanning point 6 has reached the point c the continuous spiral tracks 2 are subsequently followed sequentially until the remainder of the file has been read or written (program step 63). The scanning point then moves gradually in the opposite second radial direction.

Figure 6A:
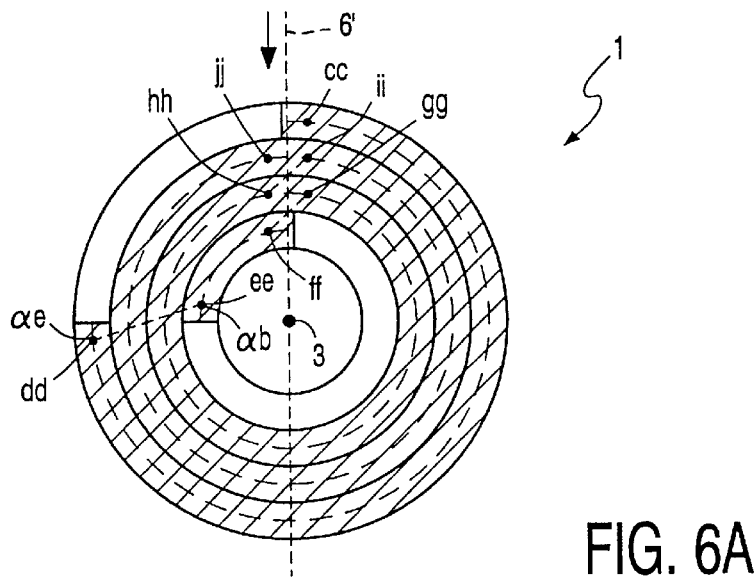
FIG. 6A shows a second information carrier, for which a path followed by the scanning point in the case of another method in accordance with the invention is indicated, FIG. 6B graphically represents the relationship between the radial coordinate (R) of the scanning point and the angle ($\alpha$) traversed by the information carrier for the path shown in FIG. 6A.
Figure 6B:
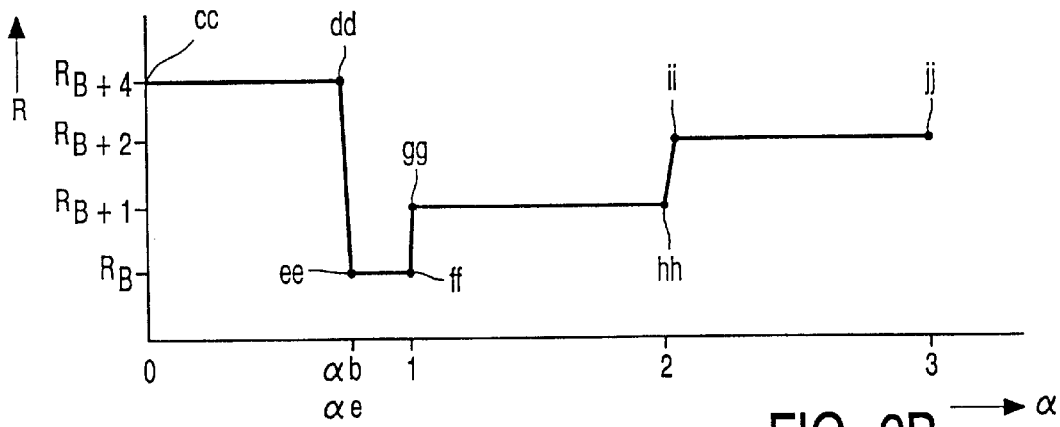

FIGS. 6A and 6B illustrate this method for an information carrier 1 having mutually concentric separate tracks. In the program step 60 the scanning point is positioned at a point cc on the outermost track which forms part of the file. In the program step 61 this track is followed to a point dd. In this program step 62 the scanning point is made to move from the point dd on the track 2 followed until then to a point ee situated on a more inward track. Subsequently, in the program step 63, the file is read/written sequentially, the scanning point following the path ee-ff-gg-hh-ii-jj. The scanning point 6 is then moved more gradually in the opposite second radial direction.

What is claimed is:
1. A method comprising the steps of:
providing a rotating information carrier having mutually substantially parallel tracks for recording information;
generating a signal indicating a position of a scanning-point of the information carrier;
rotating the information carrier at an angular velocity; and
reading or writing a continuous file in a scanning mode including moving the scanning point both from one track to another track in a first radial direction and from one track to another track in a second radial direction opposite to the first radial direction, wherein the motion of the scanning point in the first radial direction is a sequence of one or more motions over respective finite time intervals such that said motion of the scanning point in the first radial direction during each of said time intervals is at a speed that is linearly proportional to said angular velocity, and wherein the motion of the scanning point in the second radial direction is a sequence of one or more motions over respective finite time intervals such that said motion of the scanning point in the second radial direction during each of said time intervals is at a speed that is linearly proportional to said angular velocity.

2. The method of claim 1, wherein during every revolution of the information carrier during said rotation said scanning point jumps from one track to another track in the first radial direction and jumps from said one track to another track in the second radial direction.

3. The method of claim 2, wherein the tracks of the information carrier have been divided into sectors having a header, wherein sectors of mutually adjacent tracks having mutually the same tangential boundaries, and wherein jumping from one track to another track in either the first radial direction or the second radial direction is effected while the scanning point is situated on a header.

4. The method of claim 1, wherein the information carrier is selected from the group consisting of a magnetic information carrier and an optical information carrier.

5. The method of claim 1, further comprising determining coordinates of a starting position of a file on the information carrier.

6. The method of claim 1, further comprising determining coordinates of an ending position of a file on the information carrier.

7. Apparatus comprising:
  a transducer for scanning an information carrier, wherein the transducer generates a position signal indicating the position of a scanning point of the information carrier, and wherein the position of the scanning point is scanned by the transducer;
  rotating means for rotating the information carrier at an angular velocity about an axis; and
  moving means for moving the scanning point radially with respect to the axis between approximately parallel tracks in a scanning mode, wherein during reading or writing a continuous file, the scanning point is moved both from one track to another track in a first radial direction and from one track to another track in a second radial direction opposite to the first radial direction, wherein the motion of the scanning point in the first radial direction is a sequence of one or more motions over respective finite time intervals such that said motion of the scanning point in the first radial direction during each of said time intervals is at a speed that is linearly proportional to said angular velocity, and wherein the motion of the scanning point in the second radial direction is a sequence of one or more motions over respective finite time intervals such that said motion of the scanning point in the second radial direction during each of said time intervals is at a speed that is linearly proportional to said angular velocity.

8. The apparatus of claim 7, wherein the apparatus comprises a buffer coupled to the transducer.

9. The apparatus of claim 7, wherein the moving means for moving the scanning point radially with respect to the axis includes: coarse positioning means and fine positioning means for jumping to an adjacent track being effected by the fine positioning means.

10. The apparatus of claim 7, wherein the tracks of the information carrier have been divided into sectors having a header, wherein sectors of mutually adjacent tracks having mutually the same tangential boundaries, and wherein jumping from one track to another track is effected while the scanning point is situated on a header.

11. The apparatus of claim 7, wherein the information carrier is selected from the group consisting of a magnetic information carrier and an optical information carrier.

* * * * *